June 1, 1965  E. A. NIELSEN  3,186,934
RECOVERY OF ACID OILS
Filed Sept. 27, 1961
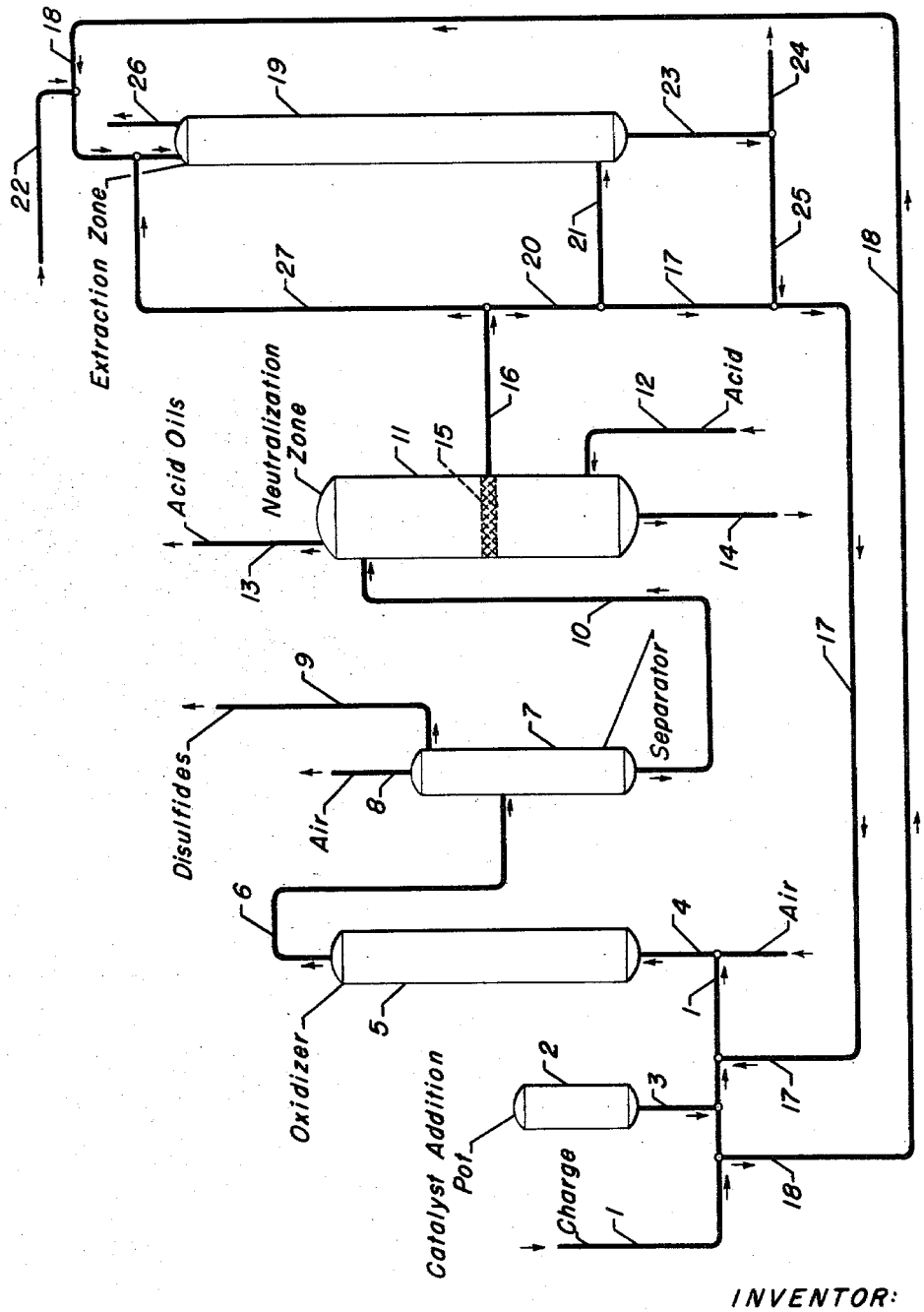
INVENTOR:
Earl A. Nielsen
BY: Chester J. Giuliani
Bernard L. Kramer
ATTORNEYS.

United States Patent Office 3,186,934
Patented June 1, 1965

3,186,934
RECOVERY OF ACID OILS
Earl A. Nielsen, Lombard, Ill., assignor to Universal Oil Products Company, Des Plaines, Ill., a corporation of Delaware
Filed Sept. 27, 1961, Ser. No. 141,210
12 Claims. (Cl. 208—2)

This invention relates to the recovery of acid oils from alkaline solutions containing said acid oils and sulfur impurities.

Acid oils comprise primarily phenolic compounds of various species, including phenols, cresols, thiophenols, etc., and also contain carboxylic acids including both aliphatic and naphthenic. The acid oils are used for many purposes as, for example, phenolic acid oils are used, after further separation, in the manufacture of phenolformaldehyde resins. The acid oils also are used as intermediates in the manufacture of various chemical compounds. The acid oils also find use as disinfectants. Accordingly, it is desirable to recover the acid oils free from impurities.

Acid oils are recovered from petroleum sources by treating with an alkaline solution to form the corresponding salts or other compounds of the acid oils and alkaline compounds. The petroleum also contains mercaptans and the acid oils are recovered in the alkaline solution in admixture with mercaptans in the form of alkaline mercaptides. The mercaptans are objectionable for the further use of the acid oils and must be removed. While petroleum provides one source of acid oils, acid oils also are obtained during the coking of coal, etc. Regardless of the source of the acid oils, when the acid oils are contaminated with mercaptans, the present invention provides an improved method for recovering acid oils substantially free of sulfur impurity.

In one embodiment the present invention relates to a process for recovering acid oils from used alkaline solution containing said acid oils and sulfur impurity, which comprises oxidizing said alkaline solution in the presence of a phthalocyanine catalyst to convert the sulfur impurity, separating the converted sulfur impurity from alkaline solution containing acid oils and catalyst, reacting said solution with an acidic reactant, thereafter allowing the resultant reaction mixture to settle into an upper acid oil phase, a lower neutralized alkaline phase and an interfacial catalyst phase, separately withdrawing each phase, and recycling at least a portion of said interfacial catalyst phase for further use in the oxidation of used alkaline solution.

In the process set forth in the above embodiment it will be noted that an interfacial catalyst phase is separated from the other reaction products, and the thus recovered catalyst phase is recycled, at least in part, for further use in the oxidation of used alkaline solution. Because acid oils normally are marketed at a comparatively low price, any method of reducing the treating cost to recover the acid oils is desirable. While the phthalocyanine catalyst is used in a comparatively small concentration, the cost of the catalyst adds to the cost of the process for recovering the acid oil. It now has been discovered that an interfacial catalyst phase forms in the settling of the reaction mixture and that this interfacial phase can be recycled and reused in the oxidation step of the process. The reuse of this catalyst phase reduces the amount of fresh catalyst which otherwise would be required and, in turn, reduces the cost of the process for recovering the acid oils.

As above described, the alkaline solution of acid oils is reacted with an oxidizing agent in the presence of a phthalocyanine catalyst to convert mercaptans (mercaptides) to disulfides. Any suitable oxidizing agent may be used in the process and preferably comprises air. Oxygen or other oxygen-containing gases may be employed when desired.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In one embodiment the phthalocyanine catalyst is prepared as a stock solution in an alkaline solvent and the stock solution is introduced into the process. The stock solution may comprise any suitable alkaline solvent and particularly an aqueous solution of sodium hydroxide (caustic), potassium hydroxide, etc., although in some cases solutions of ammonium hydroxide, lithium hydroxide, rubidium hydroxide and/or cesium hydroxide may be employed. In another embodiment the phthalocyanine catalyst is composited with a solid carrier and used as finely divided particles. Any suitable carrier may be employed. Charcoal is a particularly preferred carrier. Illustrative charcoals include bone char, wood charcoal, charcoal made from coconut or other nut shells, fruit pits, etc. Other carriers include coke, silica, alumina, silica-alumina composites, etc., which may be either synthetically prepared or naturally occurring, the latter usually being activated by acid, heat or other treatment. When the phthalocyanine catalyst is composited with the carrier, this may be prepared in any suitable manner such as by dipping, suspending, immersing, etc. particles of the solid carrier in a solution containing the phthalocyanine catalyst, or the solution may be sprayed, poured or otherwise contacted with the carrier. In a preferred embodiment the solid carrier is formed into particles of uniform or irregular size and shape prior to compositing with the phthalocyanine catalyst.

The invention is further explained with reference to the accompanying flow diagrammatic drawing which illustrates one embodiment of the invention.

As hereinbefore set forth, the acid oils generally are recovered in an alkaline solution. Any suitable alkaline solution is used in recovering the acid oils and may comprise an aqueous solution of sodium hydroxide, potassium hydroxide, ammonium hydroxide, lithium hydroxide, rubidium hydroxide and/or cesium hydroxide. In general, sodium hydroxide and potassium hydroxide are preferred because of their lower cost and availability. While aqueous solutions of the alkali metal hydroxides are preferred, it is understood that other suitable solutions may be employed such as alcoholic solutions, ketone solutions, etc.

Referring to the drawing, the alkaline solution containing acid oil and sulfur impurity is introduced into the process through line 1. Phthalocyanine catalyst, either as a solution in alkaline solvent or as a suspension of finely divided solid particles in a carrier liquid, is contained in catalyst addition pot 2 and is directed through line 3 into line 1. Air or other suitable oxidizing agent is introduced through line 4 and the mixture then passes into oxidizer 5. In oxidizer 5 the alkaline solution and catalyst are intimately contacted with the air in order to effect oxidation of the sulfur impurity contained in the alkaline solution. While upward flow through oxidizer 5 is illustrated in the drawing, it is understood that downward flow or countercurrent flow of charge and air may be employed. Also, when desired, the charge and/or air may be introduced through suitable spray devices not illustrated.

In still another embodiment a batch type oxidation may be employed. In the batch type process, the alkaline solution containing acid oil and sulfur impurity is disposed in a reaction vessel into which the catalyst also is introduced. Air or other suitable oxidizing gas then is bubbled into the reaction mixture. Preferably the reactor contains suitable mixing devices such as mixing blades. In some cases mixing is obtained by recirculating the reaction mixture out of and back into the reactor by means of a pump.

In the embodiment illustrated in the drawing, the concentration of catalyst introduced by way of line 3 will depend upon the concentration of sulfur impurity in the alkaline solution charged to the process. This may range from 5 to 2000 parts per million or more and preferably from 10 to 300 parts per million of catalyst based on the alkaline solution charged to the process. In accordance with the improvement of the present invention, the concentration of fresh catalyst originally supplied and the amount thereof continuously or intermittently added during the operation of the process will be considerably reduced, even to the point, in some cases, of completely eliminating the addition of fresh catalyst during the continued operation of the process. However, some of the catalyst may be lost during operation of the process and, in such cases, will be replaced by fresh catalyst introduced into the process by way of line 3.

Zone 5 also may contain suitable contacting devices such as side to side pans, bubble decks, bubble trays, etc. in order to obtain intimate contacting of the charge, air and catalyst. Any suitable temperature may be used in zone 5 and may range from atmospheric to 400° F. or more, although in general it will not be necessary to utilize temperatures above about 250° F. Although atmospheric pressure may be employed, it generally is preferred to utilize superatmospheric pressure which may range from 5 to 1000 p.s.i.g. or more and preferably from 10 to 200 pounds. In any event the pressure will be sufficient to pressure the effluent products from zone 5 into the subsequent steps of the process. The time of contact in zone 5 will be controlled to effect the desired oxidation of mercaptans to disulfides and may range from a matter of minutes to 24 hours or more, depending upon the particular operation employed.

In the case illustrated in the drawing, the reaction mixture from oxidizer 5 is passed by way of line 6 to separating zone 7. In zone 7, excess air is removed from the process through line 8 and generally will be vented to the atmosphere, preferably through an incinerator, although it may be supplied for any desired use. In zone 7 an upper disulfide layer separates from an alkaline solution of acid oils now substantially reduced in sulfur impurity. The disulfides are withdrawn from zone 7 through line 9, while the alkaline solution containing acid oils and phthalocyanine catalyst is withdrawn from zone 7 through line 10 and is supplied to neutralization zone 11.

Neutralization of the alkaline solution to spring the acid oils is effected in any suitable manner and may be effected in one or a multiple of stages. In one embodiment the neutralization is effected by blowing flue gas or other suitable acidic gas stream through the solution in zone 11. In another embodiment neutralization of the alkaline solution is effected by reacting with a mineral acid which preferably comprises hydrochloric acid or sulfuric acid. The neutralization methods described above are conventional. However, it is understood that any other suitable method of neutralizing the alkaline solution may be used in the present invention.

Generally the neutralization is effected in a batch type operation which, in the case illustrated in the drawing, comprises introducing the acid through line 12 into zone 11 and intimately mixing the acid and alkaline solution therein. This may be accomplished in any suitable manner including the use of a suitable mixing device in zone 11, not illustrated, either with or without the use of contacting devices such as bubble trays, bubble decks, side to side pans, etc. As hereinbefore set forth, this may be effected in one or a plurality of stages and may comprise the use of one or a multiple of acidic reagents. For example in one embodiment the alkaline solution may be reacted with flue gas in one stage and then reacted with a mineral acid in another stage. The neutralization is effected at any suitable temperature which usually will be within the range of atmospheric to 250° F.

Regardless of which method is used in neutralizing the alkaline solution, the reaction mixture is allowed to settle in order to separate acid oils from neutralized alkaline solution. As illustrated in the drawing, an upper acid oil layer separates in zone 11 and is withdrawn therefrom through line 13. As hereinbefore set forth, the acid oil now is substantially reduced in sulfur impurity and thus comprises a premium acid oil product. The neutralized alkaline solution separates as a lower layer in zone 11 and is withdrawn therefrom through line 14. The composition of the neutralized alkaline solution will depend upon the particular acidic component used in the neutralization. For example, when flue gas is used, the neutralized alkaline solution will comprise alkaline carbonate such as sodium carbonate when the alkaline solution charged to the process is caustic solution (sodium hydroxide), potassium carbonate when the original alkaline solution comprises potassium hydroxide, etc. When hydrochloric acid is used for the neutralization, the neutralized alkaline solution comprises sodium chloride, potassium chloride, etc. Similarly, when the acid used in the process comprises sulfuric acid, the neutralized alkaline solution comprises sodium sulfate, potassium sulfate, etc. The neutralized alkaline solution withdrawn through line 14 may be used for any suitable purpose.

During the settling of the acid oils and neutralized alkaline solution, an interfacial catalyst phase also separates. In accordance with the present invention the interfacial catalyst phase is recycled for further use in the oxidation of the alkaline solution charged to the process. In one embodiment the interfacial catalyst phase, designated at 15, is withdrawn from zone 11 through line 16 and is returned by way of lines 17, 1, and 4 to oxidizer 5. As hereinbefore set forth, it has been found that the interfacial catalyst phase may be satisfactorily reused in the oxidation of the alkaline solution and this, in turn, reduces the amount of fresh catalyst which need be introduced to the process through line 3. As hereinbefore set forth, this reduces the amount and cost of fresh catalyst required and accordingly reduces the cost of the process to recover the acid oils. In some cases, the addition of fresh catalyst during the continued operation of the process is not necessary and the required catalyst is furnished by the recycled catalyst phase. However, while the catalyst is substantially not soluble, or only very slightly so, in either the acid oil phase or the neutralized alkaline phase, occasionally some precipitation of catalyst may occur and, in such cases, it may be necessary to replace the lost catalyst with fresh catalyst during the continued operation of the process.

In most cases the direct return of the interfacial catalyst phase from zone 11 to zone 5 is satisfactory. However, in some cases, the interfacial catalyst phase may be subjected to further treatment before recycling. When such a treatment is employed, a preferred method is to extract the catalyst in an alkaline solution and recycle the same to the oxidation step of the process. In this embodiment a portion of the original alkaline solution charged to the process is utilized for this purpose and is directed by way of line 18 to extraction zone 19. The interfacial catalyst phase, in this embodiment is directed through lines 20 and 21 to zone 19. In another embodiment of the invention fresh alkaline solution or alkaline solution which had been used in a different process may be utilized and is introduced through line 22 and passed through line 18 into zone 19. The alkaline solution used for this purpose may comprise an alkaline solution hereinbefore specifically set forth, including particularly sodium hydroxide and potassium hydroxide. Ammonium hydroxide or buffered ammoniacal solution may be used. In a preferred embodiment the alkaline solution containing catalyst is withdrawn from zone 19 through line 23 and, while all or a portion thereof may be withdrawn through line 24, at least a portion thereof is recycled by way of lines 25, 17, 1 and 4 to oxidizer 5 for reuse therein. Material not soluble in the alkaline solution is withdrawn from zone 19 through line 26 for any suitable use or disposal.

While countercurrent flow of catalyst phase and alkaline solution is illustrated in the drawing, it is understood that concurrent flow may be employed in zone 19 and is accomplished, as illustrated in the drawing, by passing the interfacial catalyst phase through lines 16, 27 and 18 into the upper portion of zone 19 along with the alkaline solution. Concurrent flow upward through the zone also may be utilized when desired. In any event zone 19 is operated, either batch or continuously, with sufficient settling to permit the separate withdrawal of the two phases therein. Also, it is understood that extraction zone 19 may comprise two or more different zones in order to permit the desired extraction and settling to occur.

In another embodiment of the invention zone 19 may contain a bed of adsorptive solid and the interfacial catalyst phase is passed through lines 16, 27 and 18 downwardly through the bed of adsorptive material or through lines 16, 20 and 21 upwardly through said adsorptive material. Any suitable adsorptive material may be employed. Charcoal is a preferred material for such use. Other materials include sand, clay, alumina, etc. The catalyst is retained by the solid adsorptive material and subsequently is extracted therefrom by means of a suitable alkaline solution. The alkaline solution is selected from those hereinbefore specifically set forth and, in a specific embodiment, is introduced into zone 19 by way of line 22 and directed through line 18. In unusual circumstances, it may be desired to pass the extraction fluid upwardly through the bed of solid material and this may be accomplished by reversing the flow of lines 24 and 23 so that the extraction materials enter into the lower portion of zone 19.

In the embodiment of the process using the solid adsorptive material, it is understood that one or more such zones may be utilized, with one or more zones being used to adsorb the catalyst and the other zone or zones being used to extract the catalyst from the solid bed. The extraction liquid containing catalyst is withdrawn from zone 19 through line 23, when downflow of extraction liquid is used, and may be recycled by way of lines 17, 25, 1 and 4 to oxidizer 5, or it may be supplied, all or in part, by way of line 24 to any suitable treatment in order to concentrate the catalyst prior to recycling.

In the interest of simplicity, valves, heat exchangers, coolers, heaters, pumps and other appurtenances have been omitted from the drawing. It is understood that these will be provided as required.

The following examples are introduced to illustrate further the novelty and utility of the present invention but not with the intention of unduly limiting the same.

*Example I*

The alkaline solution of acid oils used in this example is a caustic solution containing acid oils recovered from cracked gasoline. The caustic solution of acid oils has a specific gravity of about 1.2, an NaOH content of about 17% by weight, an acid oil content of about 35% by weight and a mercaptan sulfur content of about 6% by weight.

Fresh cobalt phthalocyanine catalyst is added to the above caustic solution of acid oils to provide a concentration of 200 parts per million therein. The mixture then is subjected to oxidation with air at a temperature of 140° F. by passing the caustic solution, catalyst and air upward and through an oxidizing zone, and the reaction mixture then is passed to a separator. In the separator, excess air is vented, and disulfides separate from caustic solution containing acid oils and catalyst but substantially reduced in mercaptans.

The caustic solution containing acid oils and catalyst is reacted with sulfuric acid in a batch type mixing zone. After the neutralization has been completed the reaction mixture is allowed to settle into an upper acid oil phase, a lower sodium sulfate phase and an interfacial catalyst phase. Each phase is separately withdrawn from the reaction zone and, in accordance with the present invention, the interfacial catalyst phase is recycled to the oxidizer for further use therein.

Because of the recycle of the interfacial catalyst phase, it will be necessary to continuousuly or intermittently introduce fresh catalyst only to the extent of about 70 parts per million instead of 200 parts per million as otherwise would be required. Accordingly, about 65% of the catalyst required in the process is furnished by the recycled catalyst phase. It is apparent that the novel improvement of the present invention reduces the fresh catalyst requirements and accordingly reduces the cost of the process to recover the acid oils.

*Example II*

In a process similar to that described in Example I but using vanadium phthalocyanine catalyst in the oxidation step and hydrogen chloride to neutralize the caustic solution, the fresh catalyst requirement is reduced by about 70%. Accordingly, when the process is initiated with 150 parts per million of fresh catalyst, it will be necessary to introduce only 45 parts per million of fresh catalyst during the continued operation of the process.

*Example III*

In this example the interfacial catalyst phase withdrawn from the neutralization zone is supplied to a separate zone and therein countercurrently contacted with a portion of the potassium hydroxide solution of acid oils originally charged to the process. The resultant solution containing catalyst then is supplied to the oxidation zone and considerably reduces the concentration of fresh catalyst required in the process.

I claim as my invention:

1. In a process for recovering acid oils from used alkaline solution containing said acid oils and sulfur impurity, the improvement which comprises oxidizing said alkaline solution in the presence of a phthalocyanine catalyst to convert the sulfur impurity, separating the converted sulfur impurity from alkaline solution containing acid oils and catalyst, neutralizing said solution, thereafter allowing the resultant reaction mixture to settle into an upper acid oil phase, a lower neutralized alkaline phase and an interfacial catalyst phase between said upper and lower phases, separately withdrawing each phase, and recycling at least a portion of said interfacial catalyst phase to the oxidizing step for further use in the oxidation of used alkaline solution.

2. The process of claim 1 wherein said catalyst is cobalt phthalocyanine sulfonate.

3. The process of claim 1 wherein said catalyst is vanadium phthalocyanine sulfonate.

4. The process of claim 1 wherein said solution is neutralized with hydrochloric acid.

5. The process of claim 1 wherein said solution is neutralized with sulfuric acid.

6. The process of claim 1 wherein said solution is neutralized with flue gas.

7. The process of claim 1 wherein the separately withdrawn interfacial catalyst phase is contacted with an alkaline solution prior to recycling for further use in said oxidation.

8. The process of claim 7 wherein said alkaline solution is a portion of said used alkaline solution containing said acid oils and sulfur impurity.

9. In a process for recovering acid oils from used caustic solution containing said acid oils and mercaptan impurity, the improvement which comprises oxidizing said alkaline solution in the presence of a phthalocyanine catalyst to convert the mercaptan impurity, separating the resultant disulfides from caustic solution containing acid oils and catalyst, neutralizing said solution, thereafter allowing the resultant reaction mixture to settle into an upper acid oils phase, a lower neutralized caustic phase and an interfacial catalyst phase between said upper and lower phases, separately withdrawing each phase, and recycling at least a portion of said interfacial catalyst phase to the oxidizing step for further use in the oxidation of used caustic solution.

10. The process of claim 9 wherein said catalyst is cobalt phthalocyanine sulfonate.

11. The process of claim 9 wherein said catalyst is vanadium phthalocyanine sulfonate.

12. The process of claim 1 further characterized in that said solution is neutralized with a mineral acid.

References Cited by the Examiner
UNITED STATES PATENTS

| | | | |
|---|---|---|---|
| 2,773,806 | 12/56 | Kline et al. | 208—263 |
| 2,789,134 | 4/57 | Nelson et al. | 208—263 |
| 2,853,432 | 9/58 | Glein et al. | 208—235 |
| 2,921,020 | 1/60 | Urban et al. | 208—235 |
| 2,921,021 | 1/60 | Urban et al. | 208—235 |
| 2,959,539 | 11/60 | Durad | 208—263 |
| 2,976,229 | 3/61 | Brown et al. | 208—2 |
| 3,034,980 | 5/62 | Honeycutt | 208—263 |

ALPHONSO D. SULLIVAN, *Primary Examiner.*